(12) United States Patent
Li et al.

(10) Patent No.: US 6,701,316 B1
(45) Date of Patent: Mar. 2, 2004

(54) METHOD AND APPARATUS FOR INTELLIGENT NETWORK BANDWIDTH AND SYSTEM RESOURCE UTILIZATION FOR WEB CONTENT FETCH AND REFRESH

(75) Inventors: Wen-Syan Li, Fremont, CA (US); Kasim Selcuk Candan, Mountain View, CA (US); Divyakant Agrawal, Santa Barbara, CA (US)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 09/654,106

(22) Filed: Aug. 31, 2000

Related U.S. Application Data
(60) Provisional application No. 60/195,641, filed on Apr. 7, 2000.

(51) Int. Cl.$^7$ ................................................ G06F 17/30
(52) U.S. Cl. ......................... 707/10; 709/231; 709/232
(58) Field of Search ............................. 709/232, 203, 709/219

*Primary Examiner*—Rupal Dharia
*Assistant Examiner*—April Baugh
(74) *Attorney, Agent, or Firm*—Foley & Lardner

(57) ABSTRACT

A content delivery services provider is disclosed for directing the at least one proxy server to pre-fetch content from the at least one content provider original site using an optimum pre-fetch bandwidth allocation value. The content delivery services provider is part of a system for storing and delivering content, which includes a plurality of end user browsers for requesting content, at least one content provider original site for delivering the content, and at least one proxy server for storing the content. These elements are coupled over a network for communicating with each other. The content delivery services provider programmed for: (1) modeling a retrieval time of content o of size size(o) using b units of bandwidth as $ret(o) = congestion \times size(o) \times d(b)$, wherein $d(b)$ is a unit delay observed when b units of bandwidth is used for pre-fetching the content, and congestion(Util) can be represented as $$congestion(Util) = \frac{\beta}{Util^\beta + \alpha} + \phi$$

or $congestion(Util) = \beta \times (1.0 - Util)^\alpha + \phi$; (2) modeling an amount of delay observed by the at least one proxy server for the content fetched from the at least one content provider original site at time $t_0$ as $$ret(P) = congestion\left(\frac{P + r(t_0)}{B}\right) \times r(t_0) \times d,$$

wherein P is a pre-fetch bandwidth size, B is a total bandwidth available to the system, $r(t) = (1 - \sigma(P)) \times u(t)$ is an amount of bandwidth the system uses for retrieving end user browser requests for content that is not stored in the at least one proxy server, $\sigma(P)$ is a cache freshness and availability value given a bandwidth P, and $u(t)$ is a user access rate; (3) calculating the optimum pre-fetch bandwidth allocation value P by solving $$\frac{\delta ret(P)}{\delta P} = 0;$$

and (4) communicating the optimum pre-fetch bandwidth allocation value P to the at least one proxy server.

24 Claims, 4 Drawing Sheets

METHOD AND APPARATUS FOR INTELLIGENT NETWORK BANDWIDTH AND SYSTEM RESOURCE UTILIZATION FOR WEB CONTENT FETCH AND REFRESH

CROSS-REFERENCE TO RELATED APPLICATIONS

Embodiments of the present invention claim priority from a U.S. Provisional Application entitled "Method and Apparatus of Intelligent Network Bandwidth Utilization for Web Content Fetch," Ser. No. 60/195,641, filed Apr. 7, 2000, the contents of which are incorporated by reference herein.

BACKGROUND OF THE INVENTION

1. Field of the Invention

The present invention relates, generally, to content delivery networks and, in preferred embodiments, to methods and apparatus for intelligent network bandwidth and system resource utilization for efficient web content fetching and refreshing.

2. Description of the Related Art

Web performance is a key point of differentiation among content providers. Snafus and slowdowns with major Web sites demonstrate the difficulties companies face when trying to scale large Web traffic. As Internet backbone technologies develop, many innovations, such as quality of service management, have been used to improve network bandwidth and improve Web content retrieval time. These improvements to infrastructure, however, cannot solve traffic problems occurring at any one point in the Internet. For example, in FIG. 1, an end user 10 in a network 12 in Japan wants to access a page in a content provider original Web site 14 in a network 16 in the U.S. The request will pass through several Internet Service Provider (ISP) gateways 18, 20, and 22 before it reaches the content provider original Web site 14. Because of gateway bottlenecks and other delay factors along the Internet paths between the user and the content provider original Web site 14, a content fetching and refreshing methodology utilizing a proxy server on the end user side of the gateways could provide faster response time.

FIG. 2 illustrates a typical Web content delivery and caching scheme 24 which includes a caching system 26 connected to multiple non-specific Web sites 28 and 30. The caching system 26 is comprised of a proxy server or cache server 32 and cache 34. Alternatively, the caching system 26 of FIG. 2 can be replaced by a content delivery services provider and mirror sites, which would be connected to Web sites that have entered into subscriber contracts with the content delivery services provider. These subscriber Web sites will deliver content to the content delivery services provider for mirroring, but will not necessarily notify the content delivery services provider when the content has changed. In addition, it should be understood that the cache 34 may be proxy cache, edge cache, front end cache, reverse cache, and the like.

In FIG. 2, when content is delivered from a Web site to cache 34, a header called a meta-description or meta-data is delivered along with the content. The meta-data may be a subset of the content, or it may indicate certain properties of the content. For example, the meta-data may contain a last-modified date, an estimate that the content will expire at a certain time, and an indication that the content is to expire immediately, or is not to be cached. After the content and meta-data are delivered, if storing the content in cache 34 is indicated by the meta-data, the content will be stored in cache 34.

When a user 36 (user 1) requests access to a page (e.g., index.html) from a Web site 28 (Web site 1), the Web browser of user 1 will first send a request to a domain name server (DNS) to find the Internet Protocol (IP) address corresponding to the domain name of Web site 1. If, as in the example of FIG. 2, a caching system 26 is employed, the Web browser may be directed to the proxy server 32 rather than Web site 1. The proxy server 32 will then determine if the requested content is in cache 34.

However, even though the requested content may be found in cache 34, it must be determined whether the content in cache 34 is fresh. This problem can be described as database synchronization. In other words, it is desirable for the cache 34 and Web site 1 to have content that is the same. As described above, however, subscriber Web sites may not notify the proxy server 32 when their content has changed. Thus, the proxy server 32 may examine the meta-data associated with the requested content stored in cache 34 to assist in determining of the content is fresh.

If the requested content is found in the cache 34 and the meta-data indicates that the estimated time for expiration has not yet occurred, some caching systems will simply deliver the content directly to the user 1. However, more sophisticated caching systems may send a request to Web site 1 for information on when the desired content was last updated. If the content was updated since the last refresh into cache 34, the content currently in the cache 34 is outdated, and fresh content will be delivered into the cache 34 from Web site 1 before it is delivered to the user 1. It should be understood, however, that this process of checking Web sites to determine if the content has changed will also increase bandwidth or system resource utilization.

Similarly, if the requested content is found in the cache 34 but the content was set to expire immediately, some caching systems will simply fetch the content from Web site 1 and deliver it to user 1. However, if the user requests a validation of data freshness, some caching systems may send a request to Web site 1 for information on when the desired content was last updated. If the content was last updated prior to the last refresh into cache 34, the content is still fresh and the caching system will deliver the content to user 1, notwithstanding the "expired immediately" status of the content.

If the requested content is not in the cache 34, the proxy server 32 will send the request to Web site 1 to fetch the text of the desired Web page (e.g., index.html). After user 1's Web browser receives index.html, the browser will parse the html page and may issue additional requests to Web site 1 to fetch any embedded objects such as images or icons. However, if a caching system 26 is employed, the proxy server 32 will first determine if the embedded objects are available in the cache 34. All traffic (i.e., data flow) is recorded in a log file 38 in the proxy server 32. The log file 38 may include the IP addresses of the location from which requests are issued, the URLs of objects fetched, the time stamp of each action, and the like. Note that a proxy server 32 is usually shared by many end users so that the content in the cache 34 can be accessed by users with similar interests. That is, if user 1 accesses a page and the page is stored in the cache 34, when another user 40 (user 2) requests the same page, the proxy server 32 can simply provide the content in the cache 34 to user 2.

In some caching systems a refresh may be performed even when there is no end user request for content. Without any user request being received, the cache will send a request to the Web site that delivered content into the cache to determine when the content in the Web site was last updated. If the content has changed, the content will be refreshed from the Web site back into cache. Thus, when a request for content is received from an end user, it is more likely that the content in cache will be fresh and transmitted directly back to the end user without further delay.

Network bandwidth resources and system resources are important for end users and proxy servers connected to the Internet. The end users and proxy servers can be considered to be "competing" with each other for bandwidth and connections resources, although their goals are the same—to provide users with the fastest response time.

FIG. 3 illustrates the connections available for a typical proxy server 42. The fastest response time for an individual request can be achieved when the requested content is located in the proxy server cache and is fresh, so that the proxy server 42 does not need to fetch the content from the Web site through the Internet. This situation is known as a cache "hit." System-wide, the fastest response times are achieved with a very high cache hit ratio. Thus, it would seem clear that more pre-fetching 44, refreshing, and pre-validation will lead to more fresh content, a higher cache hit ratio, and faster response times for an end user. However, there is a trade-off. To achieve a very high cache hit ratio, the proxy server 42 may need to utilize a high percentage of network bandwidth for content refreshing, pre-fetching, fetching, or pre-validation 44 into cache. Nevertheless, despite a large amount of refreshing, there will be occasions when an end user will request content that has not been refreshed into cache, or is simply not in the cache. In such a circumstance the proxy server 42 must issue a request fetch 46 to request the content from the Web site. However, if an excessive amount of bandwidth is currently being used to refresh other content, there may be insufficient bandwidth available for the cache to fetch the requested content from the Web site, and the response time of the content fetch may actually increase substantially. Thus, it should be understood that cache refreshing and pre-fetching competes with, and can be detrimental to, Web site content fetching.

Of course, if there is unused bandwidth at any moment in time, it makes sense to pre-fetch the highest priority content into cache so that it can be available for a requesting end user. For example, assume that 20% of the bandwidth is used for fetching content from a website when an end user requests the content and there is no cache hit. If 20% of the bandwidth is used for such fetches, then 80% of the bandwidth is unused. This unused bandwidth can be used to pre-fetch other content into cache so that when end users request that content it will be available to them.

Because of the competition between cache server refreshing and pre-fetching and Web site content fetching for network bandwidth, and the impact to user response time as a result of the allocation of bandwidth to these processes, a method for determining the optimum allocation of bandwidth for cache server refreshing and pre-fetching to yield the best response time is desired. Furthermore, if only a percentage of the content stored in cache can be refreshed or pre-fetched due to bandwidth limitations, a method for determining which content to be refreshed and pre-fetch in order to maximize the cache hit ratio and response time is also desired.

SUMMARY OF THE DISCLOSURE

Therefore, it is an advantage of embodiments of the present invention to provide a method and apparatus for intelligent network bandwidth and system resource utilization for efficient web content fetching and refreshing that determines the optimum allocation of bandwidth for cache server refreshing and pre-fetching to yield the best end user response time.

It is a further advantage of embodiments of the present invention to provide a method and apparatus for intelligent network bandwidth and system resource utilization for efficient web content fetching and refreshing that determines the optimum allocation of bandwidth for cache server refreshing and pre-fetching to yield the best end user response time while accounting for fluctuations in available network bandwidth.

It is a further advantage of embodiments of the present invention to provide a method and apparatus for intelligent network bandwidth and system resource utilization for efficient web content fetching and refreshing that determines the optimum number of network connections for cache server refreshing and pre-fetching to yield the best end user response time.

It is a further advantage of embodiments of the present invention to provide a method and apparatus for intelligent network bandwidth and system resource utilization for efficient web content fetching and refreshing that determines the optimum number of network connections for cache server refreshing and pre-fetching to yield the best end user response time while accounting for fluctuations in available number of network connections.

It is a further advantage of embodiments of the present invention to provide a method and apparatus for intelligent network bandwidth and system resource utilization for efficient web content fetching and refreshing that determines which content should be refreshed and pre-fetched in order to maximize the cache hit ratio and response time.

These and other advantages are accomplished according to a content delivery services provider for directing the at least one proxy server to pre-fetch content from the at least one content provider original site using an optimum pre-fetch bandwidth allocation value. The content delivery services provider is part of a system for storing and delivering content, which includes a plurality of end user browsers for requesting content, at least one content provider original site for delivering the content, and at least one proxy server for storing the content. These elements are coupled over a network for communicating with each other.

The content delivery services provider programmed for:
modeling a retrieval time of content o of size size(o) using b units of bandwidth as ret(o)=congestion×size(o)×d(b), wherein d(b) is a unit delay observed when b units of bandwidth is used for pre-fetching the content, and congestion(Util) can be represented as $$\text{congestion}(Util) = \frac{\beta}{Util^\beta + \alpha} + \phi$$

or congestion(Util)=β×(1.0−Util)$^\alpha$+φ;

modeling an amount of delay observed by the at least one proxy server for the content fetched from the at least one content provider original site at time $t_0$ as $$ret(P) = \text{congestion}\left(\frac{P + r(t_0)}{B}\right) \times r(t_0) \times d,$$

wherein P is a pre-fetch bandwidth size, B is a total bandwidth available to the system, r(t)=(1−σ(P))×u(t) is an amount of bandwidth the system uses for retrieving end user browser requests for content that is not stored in the at least one proxy server, σ(P) is a cache freshness and availability value given a bandwidth P, and u(t) is a user access rate;

calculating the optimum pre-fetch bandwidth allocation value P by solving $$\frac{\delta ret(P)}{\delta P} = 0;$$

and communicating the optimum pre-fetch bandwidth allocation value P to the at least one proxy server.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

Figure 1:
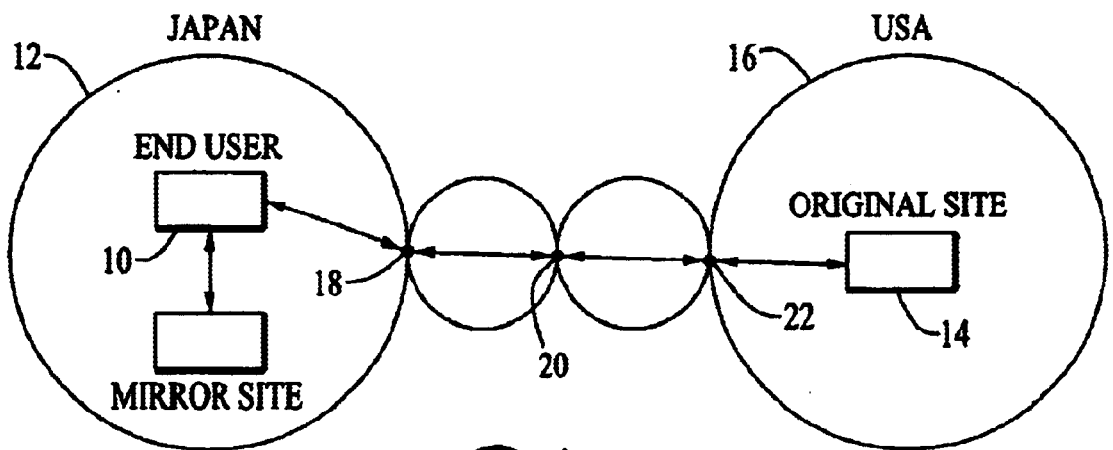
FIG. 1 is a block diagram illustrating an example of a conventional content delivery path between an end user and a web site.
Figure 2:
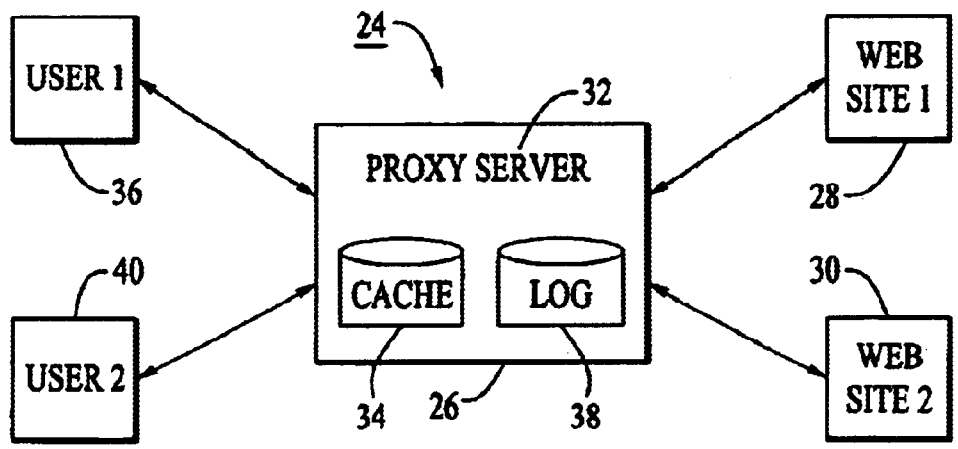
FIG. 2 is a block diagram illustrating an example of a conventional caching system.
Figure 3:
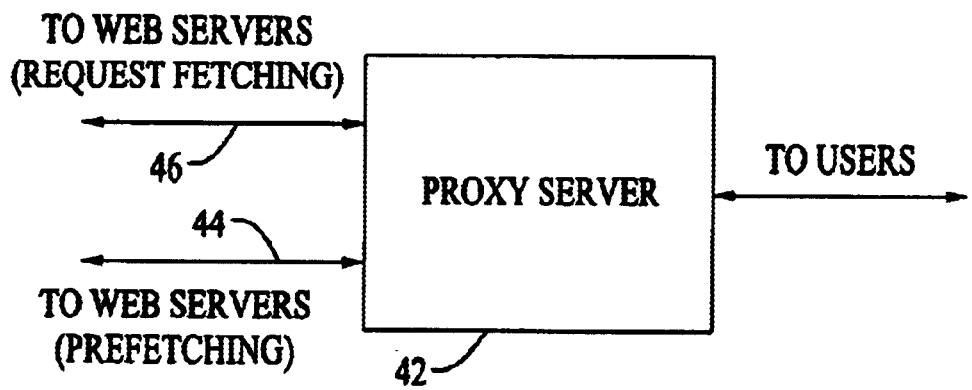
FIG. 3 is a block diagram illustrating an example of a typical connections available for a proxy server.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

The fastest response time for processing an individual end user request for content can be achieved when the requested content is located in proxy server cache and is fresh (not outdated). This is known as a cache "hit." When there is a cache hit, the content can be delivered directly from the cache to the requesting end user's browser, and the proxy server will not need to fetch the content from a content provider Web site through the Internet. System-wide, the fastest response times are achieved when the cache hit ratio is very high. Thus, it would seem clear that increased refreshing, pre-fetching, and pre-validation of the content stored in cache will lead to more fresh content, more cache hits, and faster response times for an end user. However, there is a trade-off. To achieve a very high cache hit ratio, the proxy server may need to utilize a high percentage of network bandwidth for content refreshing and pre-fetching into cache. Nevertheless, despite a large amount of refreshing, there will be occasions when an end user will request content that has not been refreshed into cache. In such a circumstance the cache must request the content from the Web site. However, if an excessive amount of bandwidth is currently being used to refresh other content, there may be insufficient bandwidth available for the cache to fetch the requested content from the Web site, and the response time of the content fetch may actually increase substantially. Thus, it should be understood that cache refreshing and pre-fetching competes with, and can be detrimental to, Web site content fetching.

Note that when the combined bandwidth utilization is low, i.e., when combined user bandwidth utilization and pre-fetch bandwidth utilization is well below the maximum available backbone bandwidth, user requests and associated response times are not impacted. However, as described above, when the combined bandwidth utilization reaches close to the maximum available bandwidth, significant latencies could arise in processing user requests that need to be served via the network.

It should be understood that response time, as referred to herein, is not simply the actual time between a user request and the delivery of content to the user. This real time is unpredictable and dependent upon factors such as the physical location of the end user and how many gateways must be traversed through the network in order to access the desired content. Thus, a more meaningful representation of response time, in this situation, is the cache hit ratio. The cache hit ratio is the percentage of times that an end user is able to access the content directly from cache when a request for that content is made. In other words, if eight out of 10 times an end user is able to access requested content directly from the cache, then the hit ratio is 80%.

It should also be noted that "refresh," "fetch," "pre-fetch," "validation," and "pre-validation" are similar in that they all require bandwidth or system resources in the same manner. Thus, although in the description given herein, reference may be made to only "refresh," "fetch," "pre-fetch," "validation," or "pre-validation," the techniques described herein apply to "refresh," "fetch," "pre-fetch," "validation," and "pre-validation."

Figure 4:
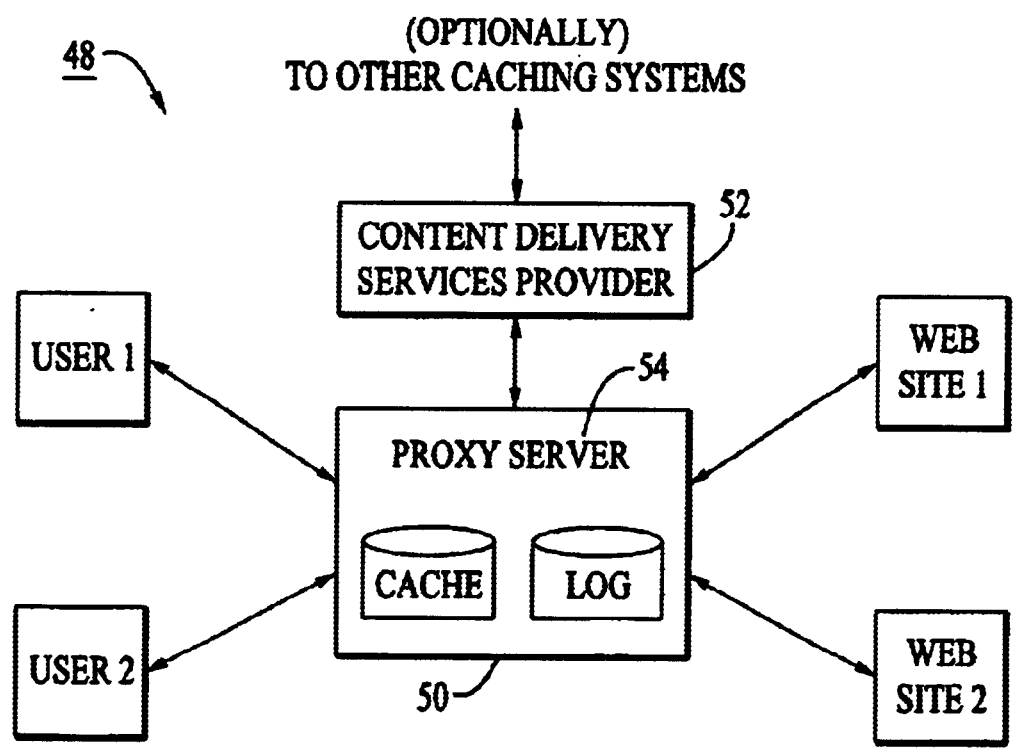
FIG. 4 is a block diagram illustrating an example caching system including a content delivery services provider for determining the optimum allocation of bandwidth for cache server refreshing and pre-fetching, the optimum number of network connections for cache server refreshing and pre-fetching, or which content should be refreshed and pre-fetched in order to maximize user response time according to an embodiment of the present invention.

FIG. 4 illustrates a system for storing and delivering content 48 according to an embodiment of the present invention. In FIG. 4, a caching system 50 operates under the control of a content delivery services provider 52, which may determine the optimum allocation of bandwidth for cache server refreshing and pre-fetching to yield the best response time, determine the optimum number of network connections for cache server refreshing and pre-fetching to yield the best response time, or may determine which content stored in cache should be refreshed or pre-fetched in order to maximize the cache hit ratio and response time. An example of a content delivery services provider 52 is CachePortal™, described in pending U.S. patent application Ser. No. 09/545,805, entitled "System and Method for Efficient Content Delivery," filed Apr. 7, 2000, the contents of which are incorporated herein by reference. It should be understood that the content delivery services provider 52 in FIG. 4 may be a separate server optionally controlling a number of caching systems, or the functionality of the content services provider 52, as described herein, may be part of the proxy server 54 in each caching system 50.

Determination of the Optimum Pre-fetch Bandwidth

A method for determining an optimum amount of network bandwidth that should be reserved for pre-fetching content into cache will now be described. Let B be the total bandwidth available to the system, and let p(t) be the amount of bandwidth used for pre-fetching content into cache. Note that the content that will need to be pre-fetched depends on the user access frequency and the freshness of the cache, which in turn depends on the amount of bandwidth used for updating the cache. Assume that, given the pre-fetch bandwidth p(t) and other parameters, a cache freshness and availability of σ(p(t)) can be maintained. Then, given a user access rate of u(t), σ(p(t))×u(t) of effective bandwidth can be obtained from the cache (i.e., a cache hit for fresh data). Accordingly, r(t)=(1−σ(p(t)))×u(t) of content must be fetched from the Web sites through the network (i.e., data is not in the cache or it is not fresh).

The user access rate may fluctuate with time. Thus, assume that a function $h_r(t)$, which describes the behavior of r(t) until time $t_0$ (i.e., $h_r(t)$=r(t) for t<$t_0$), can be determined or experimentally derived, or provided by Internet Service Providers (ISPs). A pre-fetch bandwidth size P is therefore desired at time $t_0$ such that if p(t)=P, then, the total retrieval time (delay) observed in the network will be minimum.

The retrieval time of content o of size size(o) using b units of bandwidth can be modeled as ret(o)=congestion×size(o)×d(b), where d(b) is the unit delay observed when b units of bandwidth are used for retrieving the content. Note that the parameter congestion is independent of the size of the object, but depends on the utilization of the network bandwidth.

Figure 5:
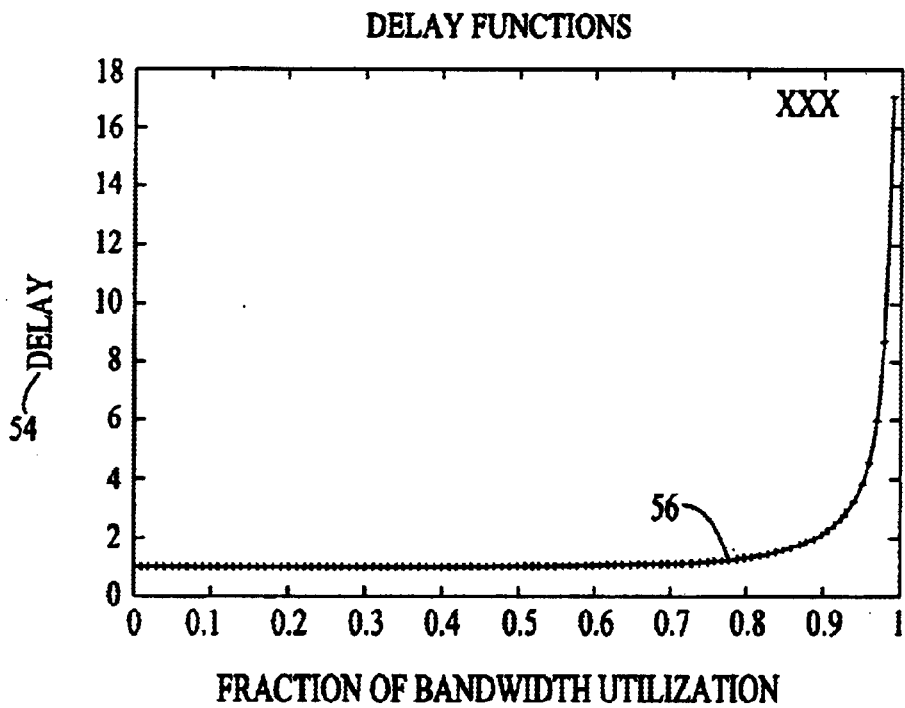
FIG. 5 is a graph illustrating the relationship between bandwidth utilization and delay.

FIG. 5 shows the relationship between bandwidth utilization and congestion. It should be understood that the delay 54 in FIG. 5 is equivalent to the response time for a user request. As FIG. 5 illustrates, bandwidth utilization from zero percent up through around 80% (see reference character 56) causes very little change in the delay. However, as bandwidth utilization exceeds 80% and then 90%, the response time for user request increases dramatically. What occurs at higher bandwidth utilization numbers are collisions between different requests for content. When collisions occur, the CPUs may begin to re-send their requests. The more collisions there are, the more re-sending of requests occur, and soon everything may collide with each other and performance can slow and even completely stop. It should be understood that FIG. 5 covers bandwidth utilization of any type.

This behavior can be approximated with various functions, including $$congestion(Util) = \frac{\beta}{Util^\theta + \alpha} + \phi$$

and congestion(Util)=β×(1.0−Util)$^\alpha$+φ, where Util describes the ratio of network bandwidth used with respect to the maximum network bandwidth, and parameters α, β, φ, and θ are used for appropriately fitting the congestion function onto the congestion curve, and are obtained statistically, experimentally, or provided by ISPs. Given a congestion function describing the behavior of the data fetch link, the amount of delay observed by the data request-fetched at time $t_0$ can be modeled as follows:

$$ret(P) = congestion\left(\frac{P + r(t_0)}{B}\right) \times r(t_0) \times d,$$

where B=B is the total bandwidth, and r(t)=(1−σ(P))×u(t) is the amount of bandwidth the system is using for retrieving user requests that are not in the cache.

Figure 6:
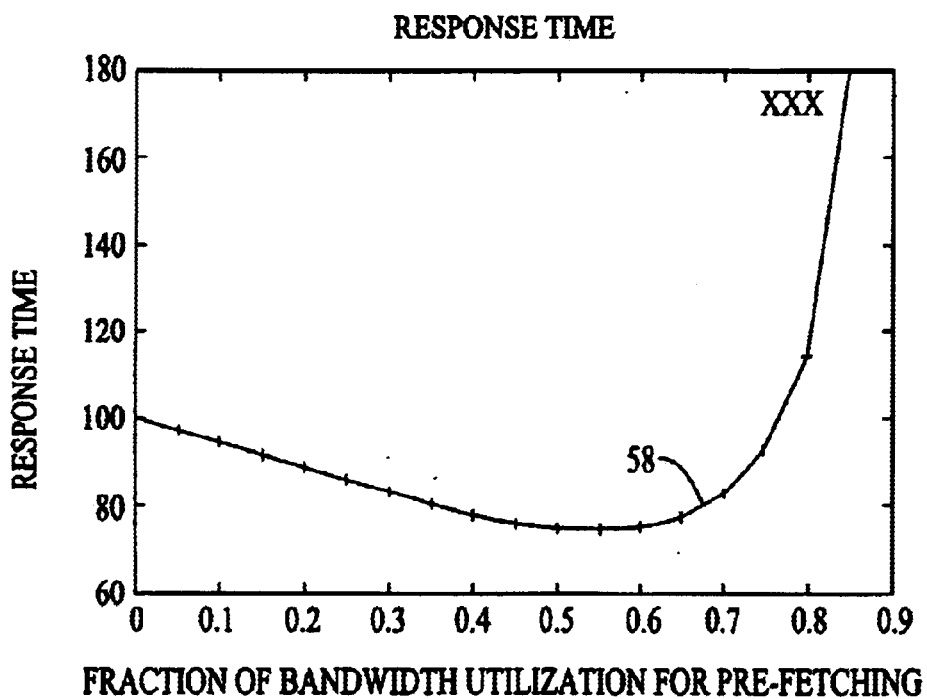
FIG. 6 is a graph illustrating the relationship between the fraction of bandwidth utilized for pre-fetching and end user response time, from which an optimal percentage of bandwidth utilized for pre-fetching is computed according to an embodiment of the present invention.

For example, FIG. 6 shows the relationship between the bandwidth used for pre-fetching and end user response time as a function of $$\frac{P}{B - R}.$$

The congestion function used for this graph is $$congestion(Util) = \frac{1.0}{1.0 - Util^6}.$$

Note that this function corresponds to the first approximation where α=−1.0, β=−1.0, θ=6, and φ=0.0. As discussed before, bandwidth utilization is really broken into two components: one component deals with user requests and the second component deals with pre-fetching. As FIG. 6 illustrates, as the amount of bandwidth used for pre-fetching increases from 0% to around 60% (see reference character 58), the end user response time decreases. However, as mentioned earlier, if too much bandwidth is used for pre-fetching, the response time will increase. FIG. 6 illustrates that above 60% bandwidth utilization for pre-fetching, the overall response time begins to increase and at 80%, response time increases dramatically. FIG. 6 demonstrates that when the bandwidth utilization is pushed too close to 100% (by allocating the entire extra bandwidth for content pre-fetching), the response time is adversely affected.

As bandwidth utilization approaches 100%, more and more collisions occur as requests to transfer content across the network get backed up. Because there is insufficient bandwidth to take care of the requests that are already being processed, new requests will continue to collide and back up. The result is a traffic gridlock that never resolves itself. Communications can actually come to a halt as incomplete requests never get completed and continually collide with other incomplete user requests, resulting in a traffic standstill. One way to prevent this gridlock is to implement admission control. Admission control is a form of safeguarding in which the bandwidth utilization is never allowed to approach 100%. For example, bandwidth utilization may only be allowed to reach the 80% mark, at which time no further user requests will be accepted. The additional 20% which is always kept available is used process requests that are already in progress. No further refreshing or pre-fetching will be scheduled until the current requests are processed out. Of course, if too much-bandwidth is reserved as a safeguard, the user response times will not be minimized.

The utilization curve of FIG. 6 illustrates that an optimum pre-fetch bandwidth allocation, where user response time is minimum, can be found at the lowest point on the curve, where the slope is zero. This optimum pre-fetch bandwidth allocation value can be calculated by solving the following differential equation for P:

$$\frac{\delta ret(P)}{\delta P} = 0.$$

Consideration of Fluctuating Bandwidth Utilization

The approach described above solves the differential equation by assuming that r(t) will be a constant (R=r($t_0$)) over a certain period of time. However, as discussed earlier, the amount of bandwidth used for retrieval of content not in cache is not constant, but rather a function of time (r(t)). Furthermore, if the assumption that "the bandwidth consumption will stay constant for long enough to fetch the objects" does not hold, then a small increase in the value of r(t) may cause a very large increase in the retrieval time.

For example, as described above, FIG. 6 represents the bandwidth utilization curve used for pre-fetching, assuming that a fixed 20% of the bandwidth is used for user requests. However, if the percentage of bandwidth used for user requests varies from the 20%, the bandwidth used for pre-fetching of 60% will also vary. In other words, if an end user's bandwidth utilization pattern for fetching content varies about the 20% point, then the bandwidth used for pre-fetching will vary about the 60% point. However, FIG. 6 illustrates that the optimum bandwidth utilization for pre-fetching of 60% is quite close to an inefficient percentage of bandwidth utilization for pre-fetching of 80%, and therefore these variations can cause substantial degradation in response times.

One way to accommodate this fluctuation in the amount of bandwidth used by end users is to not use the calculated optimum point as shown in the example of FIG. 6, but lower it. FIG. 6 illustrates that if the bandwidth utilization for pre-fetching is lowered from 60% to 50%, there is little difference in response time, but the change does provide an extra measure of safety margin to accommodate fluctuations in bandwidth used by end user requests.

It should be understood that the selection of the optimum bandwidth utilization for pre-fetching is dependent upon a number of other factors as well. For example, the algorithms used to pre-fetch content may be inaccurate, resulting in a number of user requests having to access the content from Web sites. The content stored in cache may also change often, so that user requests will frequently encounter outdated content, requiring that the content be accessed from the Web site. These factors will influence the percentage of bandwidth used for fetching content from the Web sites and therefore will have an effect on the overall response time of end user requests.

Adjusting the Pre-fetch Bandwidth

To reduce the probability that small swings in bandwidth consumption will cause large increases in retrieval time, the future behavior of the bandwidth consumption function can be considered. This behavior can be found either by utilizing resource reservation contracts (if they are available), or by using the history $h_r(t)$ to estimate the maximum amount of retrieval bandwidth and also the pre-fetch bandwidth.

The pre-fetch bandwidth can be adjusted using the future behavior as follows:

solve $$\frac{\delta ret(P)}{\delta P} = 0$$

using the current bandwidth consumption(R=r($t_0$)) for P;
  find ret(P) using the current bandwidth consumption(R=r($t_0$));
  using the history $h_r(t)$, estimate the maximum bandwidth consumption $R_{max}$ within the period [$t_0$, $t_0$+ret(P)×p], where p is the degree of future look up; and
  solve $$\frac{\delta ret(P)}{\delta P} = 0$$

using the maximum bandwidth requirement (R=$R_{max}$) for $P_{adjusted}$.

Because $P_{adjusted}$ is calculated using the estimated worst case behavior of the bandwidth consumption, $P_{adjusted}$ is likely to be smaller than P, which was calculated without any reference to the future.

Improving the Utilization

The preceding section described a worst-case method of taking into account the end user fluctuations by selecting the pre-fetch bandwidth using the estimated worst case behavior of the bandwidth utilization. The method selects the peak user access traffic and assumes that peak is constant over time. This peak value is then used and plugged into a particular formula to generate an optimal bandwidth pre-fetching utilization. This method, however, may lead to an unnecessarily low utilization of the available bandwidth. This following section describes an improved method which does not use the worst-case bandwidth utilization, but attempts to predict bandwidth utilization.

The basic concept described in this section is to examine an end user's access patterns and then recompute a bandwidth used for pre-fetching based on a predicted future end user bandwidth utilization. So, for example, if within a fixed period of time an end user's bandwidth utilization changes by a certain amount, it can be predicted that within the next fixed time period, the end user's bandwidth utilization may continue to increase at that same rate. Based on the predicted end user bandwidth utilization, a new value for bandwidth used for pre-fetching can be computed. Of course, if an end user change in bandwidth utilization is minimal, then the new predicted value for the end user's bandwidth utilization may not require any recomputation of the bandwidth to be used for pre-fetching. Thus, the optimum percentage of bandwidth used for pre-fetching is continually recalculated in order to maintain an optimum response time.

When this calculation of optimum bandwidth use for pre-fetching is initiated, an initial assumption is made regarding how much of the bandwidth is used for user requests and how much of the bandwidth is used for pre-fetching. For purposes of example only, assume that 20% of the bandwidth is used for user request and 60% is used for pre-fetching, and that with these percentages a response time of two seconds per user request is determined. After a fixed interval of time (e.g. five minutes) elapses, a new calculation is performed which determines how much of the bandwidth is used for user requests and how much of the bandwidth us used for pre-fetching. In addition, the response time is again measured. If the percentages have changed dramatically from the earlier measurement, it can be assumed that a trend was occurring during that five minute period. Because this trend could possibly have been detected if the recalculation had been performed earlier than five minutes, the time of recalculation will be moved up sooner in time (e.g. three minutes). By recalculating bandwidth utilization and response time earlier, the trend may be detected earlier and adjustments to the bandwidth utilization can also be made earlier in time.

For example, assume that at the five minute interval the bandwidth used by end users is determined to be 25% instead of 20%, and the bandwidth used for pre-fetching is determined to be 55% instead of the previous 60%. These differences indicate that the initial bandwidth utilization is not optimal and should be adjusted.

On the other hand, if after five minutes the bandwidth used by end users remains at 20% and the bandwidth used for pre-fetching remains at 60%, this is an indication that the bandwidth utilization is close to optimal and-there is no need to change it. Thus, if little difference is seen between the previous bandwidth numbers and the bandwidth numbers at the five minute interval, the recalculation point may be moved back later in time (e.g. 10 minutes). In other words, as long as the bandwidth utilization numbers remain constant and nearly optimal, the recalculation of the bandwidth utilization numbers and response times may occur infrequently. However, if the bandwidth utilization numbers change every time they are measured, then the time between calculations will gradually decrease.

It should be understood that the percentage of the bandwidth used for pre-fetching, as referred to herein, means a percentage of the bandwidth used for either pre-fetching, refreshing or simply validation of the currency of the content in cache.

It should be further understood that the prediction of a future value for the end user bandwidth utilization is not necessarily a simple linear prediction. Rather, a complex function may be developed to describe a fluctuating end user's bandwidth access patterns. In this way, fluctuating end user bandwidth patterns can also be predicted. However, this improved method will not compute a predicted end user bandwidth utilization value that would result in a pre-fetch bandwidth utilization that would push the caching system into an area of increasingly delayed response time. Instead, the computation will produce a pre-fetch bandwidth utilization number that will preserve a good end user response time.

If the difference between, P and $P_{adjusted}$ is very large, P can be re-adjusted to account for the (estimated) average bandwidth consumption instead of the (estimated) worst case consumption as follows:

let $\Delta t$ be ret($P_{adjusted}$)×p, calculated using the estimated maximum bandwidth consumption ($R_{max}$);

define average utility as $$Util_{avg} = \frac{P_{avg} \times \Delta t + \int_{t_0}^{t_0 + \Delta t} r(t)dt}{B \times \Delta t};$$

define expected retrieval time, $Ret_{exp}(P_{avg})$, using $Util_{avg}$ and $P_{avg}$; and Solve $$\frac{\delta ret_{exp}(P_{avg})}{\delta P_{avg}} = 0 \text{ for } P_{avg}.$$

$P_{avg}$ is likely to be smaller than P and larger than $P_{adjusted}$. Furthermore, because $P_{avg}$ is calculated by considering the future behavior of the bandwidth consumption, it will be less likely to be affected by changes in the consumption. Moreover, since it is not calculated based on the worst case behavior, the bandwidth utilization is likely to be better than worst case.

It should be noted that this approach requires a way to estimate the value of $$\int_{t_0}^{t_0 + \Delta t} r(t)dt.$$

Thus, advance knowledge about bandwidth consumption is necessary (which may be available in systems which use resource reservation protocols), or the future behavior of the system must be estimated using the available statistics ($h_r(t)$) about its past behavior. This information may be approximated or provided by ISPs.

Object Refresh and Pre-fetch Scheduling

Once the percentage of bandwidth that should be used for pre-fetching is determined based on the user's actual access patterns, the next step is to, determine, based on end users' query frequency and update frequency, which content should receive a higher priority in pre-fetching. In other words, for a given available network bandwidth and given the query and update frequency for stored content, this next section determines the object refresh and pre-fetch schedules, i.e., which content should be refreshed or pre-fetched.

The content most qualified to be pre-fetched would be content that is queried often and updated often. The next two best choices would be content that is either queried often but is not updated often, or content that is not queried very often but is updated very frequently. The content least likely to be pre-fetched would be content that is queried infrequently and also updated infrequently.

The priority for fetching or refreshing an object, $O_i$, can be defined as $$priority(O_i) = \frac{query\_frequency(O_i)^{c_1} \times update\_frequency(O_i)^{c_2}}{time\_to\_expire(O_i)^{c_3}},$$

where $c_1$, $c_2$, and $c_3$ are order coefficients applied to the factors of query frequency, update frequency, and time to expire. The higher the priority value is, the earlier the object will be scheduled to be refreshed or pre-fetched.

As inferred from the priority formula, if the query frequency and update frequency of two pieces of information are equivalent, then the time to expire becomes the relevant factor. For example, assume that there are two pieces of information in cache. All other things being equal, one is set to expire in one minute and the other is set to expire in five minutes. In this example, the content that is set to expire in one minute should be pre-fetched or refreshed first, because the other content affords more time to perform pre-fetching or refreshing.

Note however, the existence of order coefficients $c_1$, $c_2$, and $c_3$ in the priority formula above. These order coefficients may be dependent on the network status, and are an indication that the weight of query frequency, update frequency and time to expire may be different. In addition, the values of $c_1$, $c_2$, and $c_3$ for the optimum refresh and pre-fetch schedule may change over time. The question is how to determine these order coefficients.

New values for $c_1$, $c_2$, and $c_3$ can be assigned using statistics from a prior time period. This method can be viewed as scheduling based on query and update frequency. For example, one method would be to start with an initial set of order coefficients, and from that set of coefficients determine a priority number for each content. These priority values would then determine a preference order for pre-fetching. Based on this preference list, pre-fetching of content can occur for a period of time, and an average end user response time can be determined. Fox example, assume that the original set of coefficients produces a priority list which, when used to prioritize pre-fetching for a period of five seconds, results in an average end user response time of two seconds. Once response time data is recorded for all end user requests over this period of time, the collected data can be used to, in a sense, replay that period of time using different coefficients. Thus, a new set of coefficients will be used to prioritize pre-fetching for another period of five seconds, and a new average end user response time will be generated. This process may be repeated for multiple time periods until a set of coefficients can be chosen that results in the lowest overall access time.

Alternatively, another method would be to start with an initial set of order coefficients, determine a priority number for each content and a pre-fetching preference order, and compute an overall user response time for each of a series of intervals (e.g. T1, T2, T3, etc.). Over those time periods, the order coefficients can be adjusted until a set of coefficients is found that yields the optimum response time.

In yet another alternative method, a refresh and pre-fetch schedule can be derived by minimizing the probability that requested content is not in the cache, or is not fresh. The problem can be stated as follows: Let O be a set of objects. Given a pre-fetch bandwidth P, a time period $\Delta t$, a query probability (for a unit time) $q(o_i)$ for all $o_i \in O$, an update probability (for a unit time) $u(o_i)$ for all $o_i \in O$, a last-retrieval time $lr(o_i)$ for all $o_i \in O$, a size $size(o_i)$ for all $o_i \in O$, and a current time t, select a set of objects $O_p$ to pre-fetch in the next $\Delta t$ units such that the number of stale objects accessed in the following $\Delta t$ is minimized.

Because the end users' access pattern is known, for content stored in cache, a probability value can be determined representing the likelihood that the particular content will be accessed next. The expected number of stale objects that will be accessed in the following $\Delta t$ units of time can be calculated as follows:

Expected number of accessed stale objects =

$$\sum_{o_i \in O} prob(o_i \text{ is accessed}) \times prob(o_i \text{ is stale})$$

Note that the probability is based on the query and update frequency. The probability that $o_i$ is accessed corresponds to the query frequency divided by the time to expire. A difference between this method and the prior method is that in the above equation does not look to the past. What is important is the probability that the content will be accessed in the future. Of course, to do that, the end user's access pattern must be observed.

The other part of the above equation is the probability that $O_I$ is stale. It should be noted that update frequency is not always the most accurate of statistical measures because within a particular time period, although it may be known that particular content has been updated, it is not known whether that content was updated once or many times during that time period.

The probability that $o_i$ is accessed at least once in $\Delta t$ units of time is $prob(o_i$ is accessed$)=1-(1-q(o_i))^{\Delta t}$. The probability that an object will go stale in the next $\Delta t$ units of time is $prob(o_i$ is stale$)=1-(1-u(o_i))^{\Delta t+(t-lr(o_i))}$.

In order to minimize the probability that users will access stale data, a set of objects must be chosen whose removal from the summation will cause the largest reduction in the total. That is, if $O_p$ is the set of objects to pre-fetch, then $$\sum_{o_i \in O_p} 1 - [(1 - (1 - q(o_i))^{\Delta t}) \times (1 - (1 - u(o_i))^{\Delta t+(t-lr(o_i))})].$$

must be maximum while the objects must fit into the available bandwidth:

$$\sum_{o_i \in O_p} size(o_i) \leq P \times \Delta t.$$

This problem is known as the "0–1 Knapsack problem." There are many existing algorithms that can be used to solve the problem. The description of these algorithms are available in algorithm books, and thus the problem is well understood by those skilled in the art. Once the chosen objects are retrieved, the last-updated time of these objects must be updated appropriately.

Note that an alternative formulation of the problem is as follows: Instead of just counting the number of stale objects, the expected number of times each object is accessed can be accounted for:

Expected number of fresh accesses =

$$\sum_{o_i \in O} \text{Expected number of accesses } (o_i) \times prob(o_i \text{ is fresh})$$

The expected number of accesses to object $o_i$ in $\Delta t$ units of time is $\Delta t \times q(o_i)$. Hence, the following function is maximized instead:

$$\sum_{o_i \in O_p} q(o_i) \times \Delta t \times (1 - u(o_i))^{\Delta t+(t-lr(o_i))}.$$

Determination of the Optimum Resource Utilization Rate

Earlier sections described a technique for selecting the optimal network bandwidth for content pre-fetching and refresh. In this section, the previously described techniques are adapted to select the optimal number of network connections in a situation where the network bandwidth is sufficient but the system (i.e., cache server or proxy server) resource is the bottleneck.

Let B be the total number of connections (i.e., the number of processes or threads) that a proxy server can simultaneously open. Note that B has to be split between user connections, content prefetching connections, and request-fetching connections.

Let p(t) denote the number of connections used for pre-fetching objects into cache at time t. Note that the number of objects that will need to be request-fetched depends on the user access frequency and the freshness of the cache. Assume that p connections have been allocated for prefetching objects. Also assume that, using these p connections, a cache freshness and availability of $\sigma(p)$ can be maintained. Given a user access rate of u(t) connections (i.e., u(t) requests in which each request would use one connection) at time t, $\sigma(p) \times u(t)$ connections can be served from the proxy cache. The remaining $r(t)=(1-\sigma(p)) \times u(t)$ connections (i.e., $r(t)=(1-\sigma(p)) \times u(t)$ requests in which each request would use one connection) must be request-fetched from the sources.

The goal is to find, at time $t_0$, a pre-fetch number of connections P, such that if $p(t_0)=P$, the total retrieval time (delay) observed by the users of this proxy server will be minimized.

Retrieval Time and Optimum Pre-fetch Bandwidth

Figure 7:
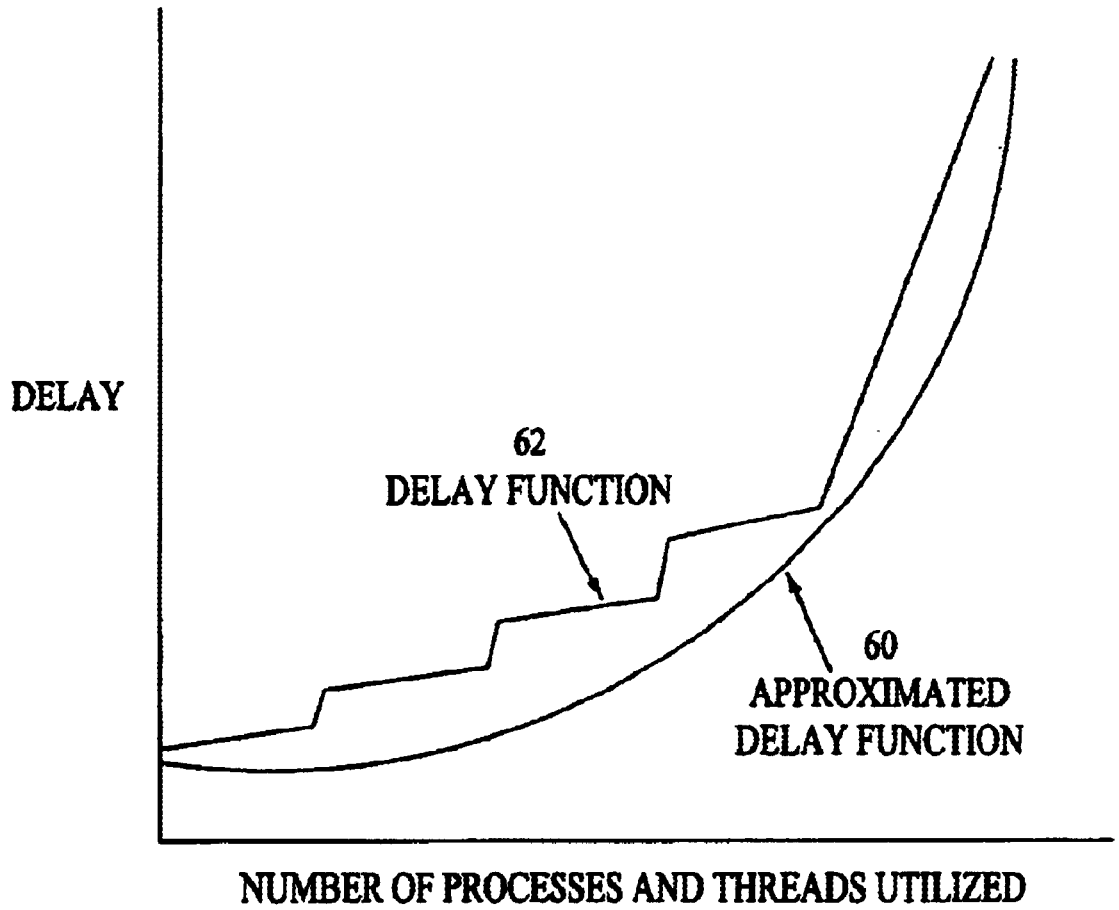
FIG. 7 is a graph illustrating the relationship between the number of network connections and end user response time.

The retrieval time of an object o of size size(o) from/to a proxy server can be modeled as $ret(o)=congestion \times size(o)$, where the parameter congestion is independent of the size of the object, but depends on the number of simultaneous connections open at the proxy server. The relationship between number of simultaneous connections and congestion is illustrated in FIG. 7. The curve is different from the curve of FIG. 5. However, an approximated delay function 60 can be used to represent the delay function 62 for the relationship between system resource utilization and delay. The following two functions can be used for this purpose:

- $congestion(Util) = \frac{\beta}{Util^\theta + \alpha} + \phi$ and
- $congestion(Util) = \beta \times (1.0 - Util)^\alpha + \phi$, where Util describes the ratio of connections open with respect to the maximum number of allowed connections, and parameters $\alpha$, $\beta$, $\phi$, and $\theta$ are used for appropriately fitting the congestion function onto the congestion curve obtained statistically.

Given a congestion function, the amount of delay observed at the proxy server at time $t_0$ can be modeled as follows:

$$ret(P) = congestion\left(\frac{P + r(t_o) + u(t_o)}{B}\right) \times (u(t_o) + r(t_o)) \times avg\_obj\_size,$$

where B=B is the maximum number of connections allowed, u(t) is the number of user requests, and $r(t)=(1-\sigma(P))\times u(t)$ is the number of connections required to request-fetch objects that are not fresh in the cache. Note that the request-fetch contents experience two delays, one because of the fetch from the original source, and the other because of the delivery to the end-user.

According to FIG. 6, when the number of connections is pushed too close to the maximum, the retrieval time is adversely affected. FIG. 6 also shows that there is an optimum number of pre-fetch connections at which the retrieval time is minimized. This optimum value can be calculated by solving the following differential equation for P:

$$\frac{\delta ret(P)}{\delta P} = 0.$$

Consideration of Fluctuating Connection Utilization

The major disadvantage of the above approach is that, the differential equation can be solved only by assuming that r(t) will be a constant (R=r(t$_0$)) over a certain period of time. However, the amount of connections required for request-fetching objects not in cache is not constant, but rather a function of time. Furthermore, a small increase in the value of r(t) may cause a very large increase in the retrieval time (similar to the behavior plotted in FIG. 6). In order to prevent such behavior, the future behavior of the request-fetching function must be considered. This behavior can be found either by putting limits on the number of request-fetches allowed, or by using its history, $h_r(t)$.

Adjusting the Pre-fetch Connections

The number of pre-fetch connections using the future behavior can be adjusted as follows:

solve $$\frac{\delta ret(P)}{\delta P} = 0$$

using the current bandwidth consumption(R=r(t$_0$)) for P;
find the amount of time $\rho$ required to prefetch P objects using the congestion value calculated uisng R and P;
using the history $h_r(t)$, estimate the maximum request-fetch connections $R_{max}$ within the period $[t_0, t_0+\rho]$, where $\rho$ is the time required to prefetch the P connections; and re-solve $$\frac{\delta ret(P)}{\delta P} = 0$$

using the maximum estimated value (R=R$_{max}$) for P$_{adjusted}$.

It should be noted that because P$_{adjusted}$ is calculated using the estimated worst case behavior of the bandwidth consumption, P$_{adjusted}$ is likely to be smaller than P, which was calculated without any reference to the future.

Improving the Utilization

The above approach selects the number of pre-fetch connections using the estimated worst case of the user requests and the corresponding request-fetch requirements. This, however, may lead to an unnecessarily low utilization of the available bandwidth.

If the difference between, P and P$_{adjusted}$ is very large, this problem can be eliminated by readjusting P to account for the (estimated) average bandwidth consumption instead of the (estimated) worst case consumption:

let $\Delta t$ be the amount of time (worst-case) required to prefetch P$_{adjusted}$ connections;
define average utilization as $$Util_{avg} = \frac{P_{avg} \times \Delta t + \int_{t_0}^{t_0+\Delta t}(r(t)dt + u(t))dt}{B \times \Delta t};$$

define expected retrieval time, Ret$_{exp}$(P$_{avg}$), using Util$_{avg}$ and P$_{avg}$; and
solve $$\frac{\delta ret_{exp}(P_{avg})}{\delta P_{avg}} = 0 \text{ for } P_{avg}.$$

P$_{avg}$ is likely to be smaller than P and larger than P$_{adjusted}$. Furthermore, because P$_{avg}$ is calculated by considering future behavior, it will be less likely to be affected by changes in the consumption. Moreover, because it is not calculated based on the worst case behavior, the utilization is likely to be better than worst case.

Note that, this approach requires a way to estimate the value of $\int_{t_0}^{t_0+\Delta t} r(t)dt$. Advance knowledge is needed or the future behavior of the system must be estimated using the available statistics ($h_r(t)$) about its past behavior.

Content Refresh and Pre-fetch Scheduling

The following section describes techniques which determine the object pre-fetch schedules based object query frequency and update frequency for a given number-of prefetch connections, which can be determined by the techniques described above.

The priority for fetching or refreshing content O$_i$ can be defined as $$priority(O_i) = \frac{query\_frequency(O_i)^{c_1} \times update\_frequency(O_i)^{c_2}}{time\_to\_expire(O_i)^{c_3}},$$

where $c_1$, $c_2$, and $c_3$ are order coefficients applied to the factors of query frequency, update frequency, and time to expire. The higher the priority value is, the earlier the content will be scheduled to refresh or pre-fetch. Note that $c_1$, $c_2$, and $c_3$ may be dependent on the network status, and the values of $c_1$, $c_2$, and $c_3$ for the optimum refresh and pre-fetch schedule may change over time.

New values for $c_1$, $c_2$, and $c_3$ can be assigned using the statistics from the prior time period.

Let O be a set of objects. Given a number of pre-fetch connections P, a time period $\Delta t$, a query probability (for a unit time) $q(o_i)$ for all $O_i \epsilon O$, an update probability (for a unit time) $u(o_i)$ for all $O_i \epsilon O$, a last-retrieval time $lr(o_i)$ for all $O_i \epsilon O$, a size $size(o_i)$ for all $o_i \epsilon O$, and a current time t, select a set of objects $O_p$ to pre-fetch in the next $\Delta t$ units such that the number of stale objects accessed in the following $\Delta t$ is minimized.

Scheduling Techniques

The expected number of stale objects that will be accessed in the following $\Delta t$ units of time can be calculated as follows:

Expected number of accessed stale objects =
$$\sum_{o_i \in O} prob(o_i \text{ is accessed}) \times prob(o_i \text{ is stale}).$$

The probability that $o_i$ is accessed at least once in $\Delta t$ units of time is $prob(o_i \text{ is accessed}) = 1-(1-q(o_i))^{\Delta t}$. The probability that an object will be go stale in the next $\Delta t$ units of time is $prob(o_i \text{ is stale}) = 1-(1-u(o_i))^{\Delta t+(t-lr(o_i))}$.

In order to minimize the probability that users will access stale data, a set of objects must be chosen whose removal from the summation will cause the largest reduction in the total. That is, if $O_p$ is the set of objects to pre-fetch, $$\sum_{o_i \in O_p} 1 - [(1 - (1 - q(o_i))^{\Delta t}) \times (1 - (1 - u(o_i))^{\Delta t+(t-lr(o_i))})].$$

must be maximized while the objects must fit into the available number of connections:

$$\sum_{o_i \in O_p} size(o_i) \leq P \times \Delta t \times \text{average bandwidth consumption per connection.}$$

This problem can be solved using 0–1 knapsack algorithm. Once the chosen objects are retrieved, the last-updated time of these objects must be updated appropriately.

Note that an alternative formulation of the problem is as follows: Instead of just counting the number of stale objects, the expected number of times each stale object is accessed can also be accounted for:

Expected number of fresh accesses =
$$\sum_{o_i \in O} \text{Expected number of accesses}(o_i) \times prob(o_i \text{ is fresh}).$$

The expected number of accesses to object $o_i$ in $\Delta t$ units of time is $\Delta t \times q(o_i)$. Hence, the following function is maximized instead:

$$\sum_{o_i \in O_p} q(o_i) \Delta t \times (1 - u(o_i))^{\Delta t+(t-lr(o_i))}.$$

Therefore, embodiments of the present invention provide a method and apparatus for intelligent network bandwidth and system resource utilization for efficient web content fetching and refreshing that determines the optimum allocation of bandwidth for cache server refreshing and pre-fetching to yield the best end user response time. In addition, embodiments of the present invention determine the optimum allocation of bandwidth for cache server refreshing and pre-fetching to yield the best end user response time while accounting for fluctuations in available network bandwidth.

Embodiments of the present invention also provide a method and apparatus for intelligent network bandwidth and system resource utilization for efficient web content fetching and refreshing that determines the optimum number of network connections for cache server refreshing and pre-fetching to yield the best end user response time. Embodiments of the present invention also determine the optimum number of network connections for cache server refreshing and pre-fetching to yield the best end user response time while accounting for fluctuations in available number of network connections.

Embodiments of the present invention also provide a method and apparatus for intelligent network bandwidth and system resource utilization for efficient web content fetching and refreshing that determines which content should be refreshed and pre-fetched in order to maximize the cache hit ratio and response time.

What is claimed is:

1. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site using a pre-fetch bandwidth allocation value, the content delivery services provider programmed for:

modeling a retrieval time of content o of size size(o) using b units of bandwidth as $ret(o) = congestion \times size(o) \times d(b)$, wherein d(b) is a unit delay observed when b units of bandwidth is used for pre-fetching the content, congestion(Util) is a function that can be represented as $$congestion(Util) = \frac{\beta}{Util^{\rho} + \alpha} + \phi$$

or $congestion(Util) = \beta \times (1.0 - Util)^{\alpha} + \phi$, Util describes a ratio of network bandwidth used with respect to a maximum network bandwidth, and parameters $\alpha$, $\beta$, and $\phi$ are used for fitting the congestion function onto a congestion curve;

modeling an amount of delay observed by the at least one proxy server for the content fetched from the at least one content provider original site at time $t_0$ as $$ret(P) = congestion\left(\frac{P + r(t_0)}{B}\right) \times r(t_0) \times d,$$

wherein P is a pre-fetch bandwidth size, B is a total bandwidth available to the system, $r(t) = (1-\sigma(P)) \times u(t)$ is an amount of bandwidth the system uses for retrieving end user browser requests for content that is not stored in the at least one proxy server, $\sigma(P)$ is a cache freshness and availability value given a bandwidth P, and u(t) is a user access rate;

calculating an optimum pre-fetch bandwidth allocation value P by solving $$\frac{\delta ret(P)}{\delta P} = 0;$$

and communicating the optimum pre-fetch bandwidth allocation value P to the at least one proxy server.

2. A content delivery services provider as recited in claim 1, the content delivery services provider further programmed for computing an adjusted pre-fetch bandwidth allocation value which takes into account estimated worst-case bandwidth utilization by:

solving $$\frac{\delta ret(P)}{\delta P} = 0$$

using a current bandwidth consumption ($R=r(t_0)$) for P;

calculating ret(P) using the current bandwidth consumption($R=r(t_0)$);

estimating a maximum bandwidth consumption $R_{max}$ within the period [$t_0$, $t_0$+ret(P)×p] using a history function $h_r(t)$ which describes the behavior of r(t) until time $t_0$, where p is a degree of future look-up;

calculating an adjusted pre-fetch bandwidth allocation value $P_{adjusted}$ by solving $$\frac{\delta ret(P)}{\delta P} = 0$$

using the estimated maximum bandwidth consumption ($R=R_{max}$); and communicating the adjusted pre-fetch bandwidth allocation value $P_{adjusted}$ to the at least one proxy server.

3. A content delivery services provider as recited in claim 2, the content delivery services provider further programmed for computing an averaged pre-fetch bandwidth allocation value which takes into account estimated average bandwidth utilization by:

calculating $\Delta t = ret(P_{adjusted}) \times p$ using the estimated maximum bandwidth consumption ($R_{max}$);

defining average utility as $$Util_{avg} = \frac{P_{avg} \times \Delta t + \int_{t_0}^{t_0+\Delta t} r(t)dt}{B \times \Delta t},$$

wherein $$\int_{t_0}^{t_0+\Delta t} r(t)dt$$

is estimated using advance knowledge about bandwidth consumption or the history function $h_r(t)$;

defining expected retrieval time $Ret_{exp}(P_{avg})$ using $Util_{avg}$ and $P_{avg}$;

calculating an estimated averaged pre-fetch bandwidth allocation value $P_{avg}$ by solving $$\frac{\delta ret_{exp}(P_{avg})}{\delta P_{avg}} = 0;$$

and communicating the averaged pre-fetch bandwidth allocation value $P_{avg}$ to the at least one proxy server.

4. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating a priority value for pre-fetching content $O_i$ as $$priority(O_i) = \frac{query\ frequency(O_i)^{c_1} \times update\ frequency(O_i)^{c_2}}{time\ to\ expire(O_i)^{c_3}},$$

wherein query frequency($O_i$), update frequency($O_i$), and time to expire($O_i$) for each content $O_i$ is obtained from a cache log file, and $c_1$, $c_2$, and $c_3$ are order coefficients which may be assigned using statistics from a prior time period or empirical computations over fixed time intervals;

selecting a set of content $O_p$ to pre-fetch in a next $\Delta t$ units of time using the calculated priority values and a given pre-fetch bandwidth; and communicating this set of content $O_p$ to the at least one proxy server.

5. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating an expected number of stale objects that will be accessed in a following $\Delta t$ units of time as $$\sum_{o_i \in O} prob(o_i\ is\ accessed) \times prob(o_i\ is\ stale),$$

wherein prob($o_i$ is accessed)=$1-(1-q(o_i))^{\Delta t}$, prob($o_i$ is stale)=$1-(1-u(o_i))^{\Delta t+(t-lr(o_i))}$, $q(o_i)$ is a query probability (for a unit time) for all $o_i \in O$, O is a set of objects, $u(o_i)$ is an update probability (for a unit time) for all $O_i \in O$, and $lr(o_i)$ is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} 1 - [(1 - (1 - q(o_i))^{\Delta t}) \times (1 - (1 - u(o_i))^{\Delta t+(t-lr(o_i))})]$$

while maintaining $$\sum_{o_i \in O_p} size(o_i) \leq P \times \Delta t$$

as a true statement, wherein size($o_i$) is a size for all $o_i \in O$ and P is a pre-fetch bandwidth; and communicating this set of content $O_p$ to the at least one proxy server.

6. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating an expected number of fresh objects that will be accessed in a following $\Delta t$ units of time as $$\sum_{o_i \in O} \text{expected number of accesses}(o_i) \times \text{prob}(o_i \text{ is fresh}),$$

wherein the expected number of accesses to object $o_i$ in $\Delta t$ units of time is $\Delta t \times q(o_i)$, $\text{prob}(o_i \text{ is fresh}) = (1-(1-u(o_i))^{\Delta t + (t - lr(o_i))})$, $q(o_i)$ is a query probability (for a unit time) for all $O_i \in O$, $O$ is a set of objects, $u(o_i)$ is an update probability (for a unit time) for all $o_i \in O$, and $lr(o_i)$ is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} q(o_i) \times \Delta t \times (1 - u(o_i))^{\Delta t + (t - lr(o_i))}$$

while maintaining $$\sum_{o_i \in O_p} size(o_i) \leq P \times \Delta t$$

as a true statement, wherein $size(o_i)$ is a size for all $o_i \in O$ and $P$ is a pre-fetch bandwidth; and communicating the set of content $O_p$ to the at least one proxy server.

7. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site using a number of pre-fetch connections, the content delivery services provider programmed for:

modeling a retrieval time of content $o$ of size $size(o)$ as $ret(o) = congestion \times size(o)$, wherein $congestion(Util)$ can be represented as $$congestion(Util) = \frac{\beta}{Util^\theta + \alpha} + \phi$$

or $congestion(Util) = \beta \times (1.0 - Util)^\alpha + \phi$, Util describes a ratio of connections open with respect to a maximum number of allowed connections, and parameters $\alpha$, $\beta$, and $\phi$ are used for fitting the congestion function onto a congestion curve;

modeling an amount of delay observed at the at least one proxy server for the content fetched from the at least content provider original site at time $t_0$ as $$ret(P) = congestion\left(\frac{P + r(t_o) + u(t_o)}{B}\right) \times (u(t_o) + r(t_o)) \times avg\_obj\_size,$$

wherein $P$ is a number of pre-fetch connections, $B$ is a maximum number of connections allowed, $r(t) = (1 - \sigma(P)) \times u(t)$ is an amount of connections the system uses to request-fetch content that is not stored in the at least one proxy server, $\sigma(P)$ is a cache freshness and availability value given a bandwidth $P$, and $u(t)$ is a user connection access rate;

calculating an optimum number of pre-fetch connections $P$ by solving $$\frac{\delta ret(P)}{\delta P} = 0;$$

and communicating the optimum number of pre-fetch connections $P$ to the at least one proxy server.

8. A content delivery services provider as recited in claim 7, the content delivery services provider further programmed for computing an adjusted number of pre-fetch connections which takes into account estimated worst-case connection utilization by:

solving $$\frac{\delta ret(P)}{\delta P} = 0$$

using a current number of connections used ($R = r(t_0)$) for $P$;

finding an amount of time $\rho$ required to prefetch $P$ content using the congestion calculated using $R$ and $P$;

estimating a maximum number of request-fetch connections $R_{max}$ within the period $[t_0, t_0 + p]$ using a history function $h_r(t)$ which describes the behavior of $r(t)$ until time $t_0$, where $p$ is a time required to prefetch the $P$ content;

calculating an adjusted number of pre-fetch connections $P_{adjusted}$ by solving $$\frac{\delta ret(P)}{\delta P} = 0$$

using the estimated maximum number of request-fetch connections ($R = R_{max}$); and communicating the adjusted number of pre-fetch connections $P_{adjusted}$ to the at least one proxy server.

9. A content delivery services provider as recited in claim 8, the content delivery services provider further programmed for computing an averaged number of pre-fetch connections which takes into account estimated average connection utilization by:

defining $\Delta t$ as a worst-case amount of time required to pre-fetch $P_{adjusted}$ connections;

defining average utilization as $$Util_{avg} = \frac{P_{avg} \times \Delta t + \int_{t_0}^{t_0 + \Delta t}(r(t)dt + u(t))dt}{B \times \Delta t},$$

wherein $$\int_{t_0}^{t_0 + \Delta t} r(t)dt$$

is estimated using advance knowledge about pre-fetch connections or the history function $h_r(t)$;

defining expected retrieval time $ret_{exp}(P_{avg})$ using $Util_{avg}$ and $P_{avg}$;

calculating an estimated averaged number of pre-fetch connections $P_{avg}$ by solving $$\frac{\delta ret_{exp}(P_{avg})}{\delta P_{avg}} = 0;$$

and communicating the estimated averaged number of pre-fetch connections $P_{avg}$ to the at least one proxy server.

10. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating a priority value for pre-fetching content $O_i$ as $$\text{priority}(O_i) = \frac{\text{query frequency}(O_i)^{c1} \times \text{update frequency}(O_i)^{c2}}{\text{time to expire}(O_i)^{c3}},$$

wherein query frequency($O_i$), update frequency($O_i$), and time to expire($O_i$) for each content $O_i$ is obtained from a cache log file, and $c_1$, $c_2$, and $c_3$ are order coefficients which may be assigned using statistics from a prior time period or empirical computations over fixed time intervals;

selecting a set of content $O_p$ to pre-fetch in a next $\Delta t$ units of time using the calculated priority values and a given number of network connections; and communicating this set of content $O_p$ to the at least one proxy server.

11. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating an expected number of stale objects that will be accessed in a following $\Delta t$ units of time as $$\sum_{o_i \in O} \text{prob}(o_i \text{ is accessed}) \times \text{prob}(o_i \text{ is stale}),$$

wherein prob($o_i$ is accessed)=$1-(1-q(o_i))^{\Delta t}$, prob($o_i$ is stale)=$1-(1-u(o_i))^{\Delta t+(t-lr(o_i))}$, q($o_i$) is a query probability (for a unit time) for all $o_i \in O$, O is a set of objects, u($o_i$) is an update probability (for a unit time) for all $o_i \in O$, and lr($o_i$) is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} 1 - [(1-(1-q(o_i))^{\Delta t}) \times (1-(1-u(o_i))^{\Delta t+(t-lr(o_i))})]$$

while maintaining $$\sum_{o_i \in O_p} \text{size}(o_i) \leq P \times \Delta t \times \text{average bandwidth}$$

consumption per connection as a true statement, wherein size($o_i$) is a size for all $o_i \in O$ and P is a pre-fetch bandwidth; and communicating the set of content $O_p$ to the at least one proxy server.

12. In a system for storing and delivering content, the system including a plurality of end user browsers for requesting content, at least one content provider original site for delivering the content, and at least one proxy server for storing the content coupled over a network for communicating with each other, a content delivery services provider for directing the at least one proxy server to pre-fetch content from the at least one content provider original site, the content delivery services provider programmed for:

calculating an expected number of fresh objects that will be accessed in a following $\Delta t$ units of time as $$\sum_{o_i \in O} \text{expected number of accesses}(o_i) \times \text{prob}(o_i \text{ is fresh}),$$

wherein the expected number of accesses to object $o_i$ in $\Delta t$ units of time is $\Delta t \times q(o_i)$, prob($o_i$ is fresh)=$(1-u(o_i))^{\Delta t+(t-lr(o_i))}$, q($o_i$) is a query probability (for a unit time) for all $o_i \in O$, O is a set of objects, u($o_i$) is an update probability (for a unit time) for all $o_i \in O$, and lr($o_i$) is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} q(o_i) \Delta t \times (u(o_i))^{\Delta t+(t-lr(o_i))}$$

while maintaining $$\sum_{o_i \in O_p} \text{size}(o_i) \leq P \times \Delta t \times \text{average bandwidth}$$

consumption per connection as a true statement, wherein size($o_i$) is a size for all $o_i \in O$ and P is a pre-fetch bandwidth; and communicating the set of content $O_p$ to the at least one proxy server.

13. In a system for storing and delivering content, the system including a plurality of end user browsers for requesting content, at least one content provider original site for delivering the content, and at least one proxy server for storing the content coupled over a network for communicating with each other, a method for pre-fetching content from the at least one content provider original site using a pre-fetch bandwidth allocation value, the method comprising the steps of:

modeling a retrieval time of content o of size size(o) using b units of bandwidth as ret(o)=congestion×size(o)×d(b), wherein d(b) is a unit delay observed when b units of bandwidth is used for pre-fetching the content, congestion(Util) can be represented as $$\text{congestion}(Util) = \frac{\beta}{Util^\beta + \alpha} + \phi$$

or congestion(Util)=$\beta \times (1.0-\text{Util})^\alpha + \phi$, Util describes a ratio of network bandwidth used with respect to a maximum network bandwidth, and parameters $\alpha$, $\beta$, and $\phi$ are used for fitting the congestion function onto a congestion curve;

modeling an amount of delay observed by the at least one proxy server for the content fetched from the at least one content provider original site at time $t_0$ as $$ret(P) = \text{congestion}\left(\frac{P + r(t_0)}{B}\right) \times r(t_0) \times d,$$

wherein P is a pre-fetch bandwidth size, B is a total bandwidth available to the system, $r(t)=(1-\sigma(P)) \times u(t)$ is an amount of bandwidth the system uses for retrieving end user browser requests for content that is not stored in the at least one proxy server, $\sigma(P)$ is a cache freshness and availability value given a bandwidth P, and u(t) is a user access rate;

calculating an optimum pre-fetch bandwidth allocation value P by solving $$\frac{\delta ret(P)}{\delta P} = 0;$$

and pre-fetching content from the at least one content provider original site using the optimum pre-fetch bandwidth allocation value P.

14. A method for pre-fetching content from the at least one content provider original site using a pre-fetch bandwidth allocation value as recited in claim 13, the method for further computing an adjusted pre-fetch bandwidth allocation value which takes into account estimated worst-case bandwidth utilization, the method further including the steps of:

solving $$\frac{\delta ret(P)}{\delta P} = 0$$

using a current bandwidth consumption ($R=r(t_0)$) for P;

calculating ret(P) using the current bandwidth consumption($R=r(t_0)$);

estimating a maximum bandwidth consumption $R_{max}$ within the period [$t_0$, $t_0+ret(P) \times p$] using a history function $h_r(t)$ which describes the behavior of r(t) until time $t_0$, where p is a degree of future look-up;

calculating an adjusted pre-fetch bandwidth allocation value $P_{adjusted}$ by solving $$\frac{\delta ret(P)}{\delta P} = 0$$

using the estimated maximum bandwidth consumption ($R=R_{max}$); and pre-fetching content from the at least one content provider original site using the adjusted pre-fetch bandwidth allocation value $P_{adjusted}$.

15. A method for pre-fetching content from the at least one content provider original site using a pre-fetch bandwidth allocation value as recited in claim 14, the method for further computing an averaged pre-fetch bandwidth allocation value which takes into account estimated average bandwidth utilization, the method further including the steps of:

calculating $\Delta t = ret(P_{adjusted}) \times p$ using the estimated maximum bandwidth consumption ($R_{max}$);

defining average utility as $$Util_{avg} = \frac{P_{avg} \times \Delta t + \int_{t_0}^{t_0+\Delta t} r(t) dt}{B \times \Delta t},$$

wherein $$\int_{t_0}^{t_0+\Delta t} r(t) dt$$

is estimated using advance knowledge about bandwidth consumption or the history function $h_r(t)$;

defining expected retrieval time $Ret_{exp}(P_{avg})$ using $Util_{avg}$ and $P_{avg}$;

calculating an estimated averaged pre-fetch bandwidth allocation value $P_{avg}$ by solving $$\frac{\delta ret_{exp}(P_{avg})}{\delta P_{avg}} = 0;$$

and pre-fetching content from the at least one content provider original site using the averaged pre-fetch bandwidth allocation value $P_{avg}$.

16. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating a priority value for pre-fetching content $O_i$ as $$priority(O_i) = \frac{\text{query frequency}(O_i)^{c_1} \times \text{update frequency}(O_i)^{c_2}}{\text{time to expire }(O_i)^{c_3}},$$

wherein query frequency($O_i$), update frequency($O_i$), and time to expire($O_i$) for each content $O_i$ is obtained from a cache log file, and $c_1$, $c_2$, and $c_3$ are order coefficients which may be assigned using statistics from a prior time period or empirical computations over fixed time intervals;

selecting a set of content $O_p$ to pre-fetch in a next $\Delta t$ units of time using the calculated priority values and a given pre-fetch bandwidth; and communicating this set of content $O_p$ to the at least one proxy server.

17. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating an expected number of stale objects that will be accessed in a following $\Delta t$ units of time as $$\sum_{o_i \in O} \text{prob}(o_i \text{ is accessed}) \times \text{prob}(o_i \text{ is stale}),$$

wherein prob($o_i$ is accessed)=$1-(1-q(o_i))^{\Delta t}$, prob($o_i$ is stale)=$1-(1-u(o_i))^{\Delta t+(t-lr(o_i))}$, $q(o_i)$ is a query probability (for a unit time) for all $o_i \in O$, O is a set of objects, $u(o_i)$ is an update probability (for a unit time) for all $o_i \in O$, and $lr(o_i)$ is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} 1 - [(1-(1-q(o_i))^{\Delta t}) \times (1-(1-u(o_i))^{\Delta t+(t-lr(o_i))})]$$

while maintaining $$\sum_{o_i \in O_p} \text{size}(o_i) \le P \times \Delta t$$

as a true statement, wherein size($o_i$) is a size for all $o_i \in O$ and P is a pre-fetch bandwidth; and pre-fetching content from the at least one content provider original site in the next $\Delta t$ units of time-from the set of content $O_p$.

18. In a system for storing and delivering content, the system including a plurality of end-user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating an expected number of fresh objects that will be accessed in a following $\Delta t$ units of time as $$\sum_{o_i \in O} \text{expected number of accesses } (o_i) \times \text{prob}(o_i \text{ is fresh}),$$

wherein the expected number of accesses to object $o_i$ in $\Delta t$ units of time is $\Delta t \times q(o_i)$, prob($o_i$ is fresh)=$(1-(1-u(o_i))^{\Delta t+(t-lr(o_i))})$, $q(o_i)$ is a query probability (for a unit time) for all $o_i \in O$, O is a set of objects, $u(o_i)$ is an update probability (for a unit time) for all $o_i \in O$, and $lr(o_i)$ is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} q(o_i) \times \Delta t \times (1-u(o_i))^{\Delta t+(t-lr(o_i))}$$

while maintaining $$\sum_{o_i \in O_p} \text{size}(o_i) \le P \times \Delta t$$

as a true statement, wherein size($o_i$) is a size for all $o_i \in O$ and P is a pre-fetch bandwidth; and pre-fetching content from the at least one content provider original site in the next $\Delta t$ units of time from the set of content $O_p$.

19. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site using a number of pre-fetch connections, the method comprising the steps of:

modeling a retrieval time of content o of size size(o) as ret(o)=congestion×size(o), wherein congestion(Util) can be represented as $$\text{congestion}(Util) = \frac{\beta}{Util^\theta + \alpha} + \phi$$

or congestion(Util)=$\beta \times (1.0-Util)^\alpha + \phi$, Util describes a ratio of connections open with respect to a maximum number of allowed connections, and parameters $\alpha$, $\beta$, and $\phi$ are used for fitting the congestion function onto a congestion curve;

modeling an amount of delay observed at the at least one proxy server for the content fetched from the at least content provider original site at time $t_0$ as $$ret(P) = \text{congestion}\left(\frac{P + r(t_o) + u(t_o)}{B}\right) \times (u(t_o) + r(t_o)) \times \text{avg obj size},$$

wherein P is a number of pre-fetch connections, B is a maximum number of connections allowed, $r(t)=(1-\sigma(P)) \times u(t)$ is an amount of connections the system uses to request-fetch content that is not stored in the at least one proxy server, $\sigma(P)$ is a cache freshness and availability value given a bandwidth P, and u(t) is a user connection access rate;

calculating the optimum number of pre-fetch connections P by solving $$\frac{\delta ret(P)}{\delta P} = 0;$$

and pre-fetching content from the at least one content provider original site using the optimum number of pre-fetch connections P.

20. A method for directing the at least one proxy server to pre-fetch content from the at least one content provider original site using a number of pre-fetch connections as recited in claim 19, the method for further computing an adjusted number of pre-fetch connections which takes into account estimated worst-case connection utilization, the method further including the steps of:

solving $$\frac{\delta ret(P)}{\delta P} = 0$$

using a current number of connections used ($R=r(t_0)$) for P;

finding an amount of time ρ required to prefetch P content using the congestion calculated using R and P;

estimating a maximum number of request-fetch connections $R_{max}$ within the period $[t_0, t_0+P]$ using a history function $h_r(t)$ which describes the behavior of $r(t)$ until time $t_0$, where p is a time required to prefetch the P content;

calculating an adjusted number of pre-fetch connections $P_{adjusted}$ by solving $$\frac{\delta ret(P)}{\delta P} = 0$$

using the estimated maximum number of request-fetch connections ($R=R_{max}$); and pre-fetching content from the at least one content provider original site using the optimum number of pre-fetch connections $P_{adjusted}$.

21. A method for directing the at least one proxy server to pre-fetch content from the at least one content provider original site using a number of pre-fetch connections as recited in claim 20, the method for further computing an averaged number of pre-fetch connections which takes into account estimated average connection utilization, the method further including the steps of:

defining Δt as a worst-case amount of time required to pre-fetch $P_{adjusted}$ connections;

defining average utilization as $$Util_{avg} = \frac{P_{avg} \times \Delta t + \int_{t_0}^{t_0}(r(t)dt + u(t))dt}{B \times \Delta t},$$

wherein $\int_{t_0}^{t_0+\Delta t} r(t)dt$ is estimated using advance knowledge about pre-fetch connections or the history function $h_r(t)$;

defining expected retrieval time $Ret_{exp}(P_{avg})$ using $Util_{avg}$ and $P_{avg}$;

calculating an estimated averaged number of pre-fetch connections $P_{avg}$ by solving $$\frac{\delta ret_{exp}(P_{avg})}{\delta P_{avg}} = 0;$$

and pre-fetching content from the at least one content provider original site using the averaged number of pre-fetch connections $P_{avg}$.

22. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating a priority value for pre-fetching content $O_i$ as $$priority(O_i) = \frac{\text{query frequency}(O_i)^{c_1} \times \text{update frequency}(O_i)^{c_2}}{\text{time to expire}(O_i)^{c_3}},$$

wherein query frequency ($O_i$), update frequency ($O_i$), and time to expire ($O_i$) for each content $O_i$ is obtained from a cache log file, and $c_1$, $c_2$, and $c_3$ are order coefficients which may be assigned using statistics from a prior time period or empirical computations over fixed time intervals;

selecting a set of content $O_p$ to pre-fetch in a next Δt units of time using the calculated priority values and a given number of network connections; and communicating this set of content $O_p$ to the at least one proxy server.

23. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating an expected number of stale objects that will be accessed in a following Δt units of time as $$\sum_{o_i \in O} prob(o_i \text{ is accessed}) \times prob(o_i \text{ is stale}),$$

wherein $prob(o_i \text{ is accessed})=1-(1-q(o_i))^{\Delta t}$, $prob(o_i \text{ is stale})=1-(1-u(o_i))^{\Delta t+(t-lr(o_i))}$, $q(o_i)$ is a query probability (for a unit time) for all $o_i \in O$, O is a set of objects, $u(o_i)$ is an update probability (for a unit time) for all $o_i \in O$, and $lr(o_i)$ is a last-retrieval time for all $o_i \in O$;

selecting a set of content $O_p$ to pre-fetch in a next Δt units of time such that a number of stale objects accessed in a following Δt is minimized by using a 0–1 knapsack algorithm to maximize $$\sum_{o_i \in O_p} 1 - [(1 - (1 - q(o_i))^{\Delta t}) \times (1 - (1 - u(o_i))^{\Delta t+(t-lr(o_i))})]$$

while maintaining $$\sum_{o_i \in O_p} size(o_i) \leq P \times \Delta t \times \text{average bandwidth consumption per connection}$$

as a true statement, wherein $size(o_i)$ is a size for all $o_i \in O$ and P is a pre-fetch bandwidth; and pre-fetching content from the at least one content provider original site in the next Δt units of time from the set of content $O_p$.

24. In a system for storing and delivering content, the system including a plurality of end user browsers for requesting content, at least one content provider original site for delivering the content, and at least one proxy server for storing the content coupled over a network for communicating with each other, a method for directing the at least one proxy server to pre-fetch content from the at least one content provider original site, the method comprising the steps of:

calculating an expected number of fresh objects that will be accessed in a following $\Delta t$ units of time as $$\sum_{o_i \in O} \text{expected number of accesses}(o_i) \times \text{prob}(o_i \text{ is fresh}),$$

wherein the expected number of accesses to object $o_i$ in $\Delta t$ units of time is $\Delta t \times q(o_i)$ and $\text{prob}(o_i \text{ is fresh}) = (1-u(o_i))^{\Delta t+(t-lr(o_i))}$, $q(o_i)$ is a query probability (for a unit time) for all $o_i \in O$, $O$ is a set of objects, $u(o_i)$ is an update probability (for a unit time) for all $o_i \in O$, and $lr(o_i)$ is a last-retrieval time for all $o_i \in O$;

selecting a set of content $O_p$ to pre-fetch in a next $\Delta t$ units of time such that a number of stale objects accessed in a following $\Delta t$ is minimized by using a 0–1 knapsack algorithm to maximize $$\sum_{o_i \in O_p} q(o_i) \Delta t \times (u(o_i))^{\Delta t+(t-lr(o_i))}$$

while maintaining $$\sum_{o_i \in O_p} \text{size}(o_i) \leq P \times \Delta t \times \text{average bandwidth consumption per connection}$$

as a true statement, wherein $\text{size}(o_i)$ is a size for all $o_i \in O$ and $P$ is a pre-fetch bandwidth; and pre-fetching content from the at least one content provider original site in the next $\Delta t$ units of time from the set of content $O_p$.

* * * * *